UNITED STATES PATENT OFFICE.

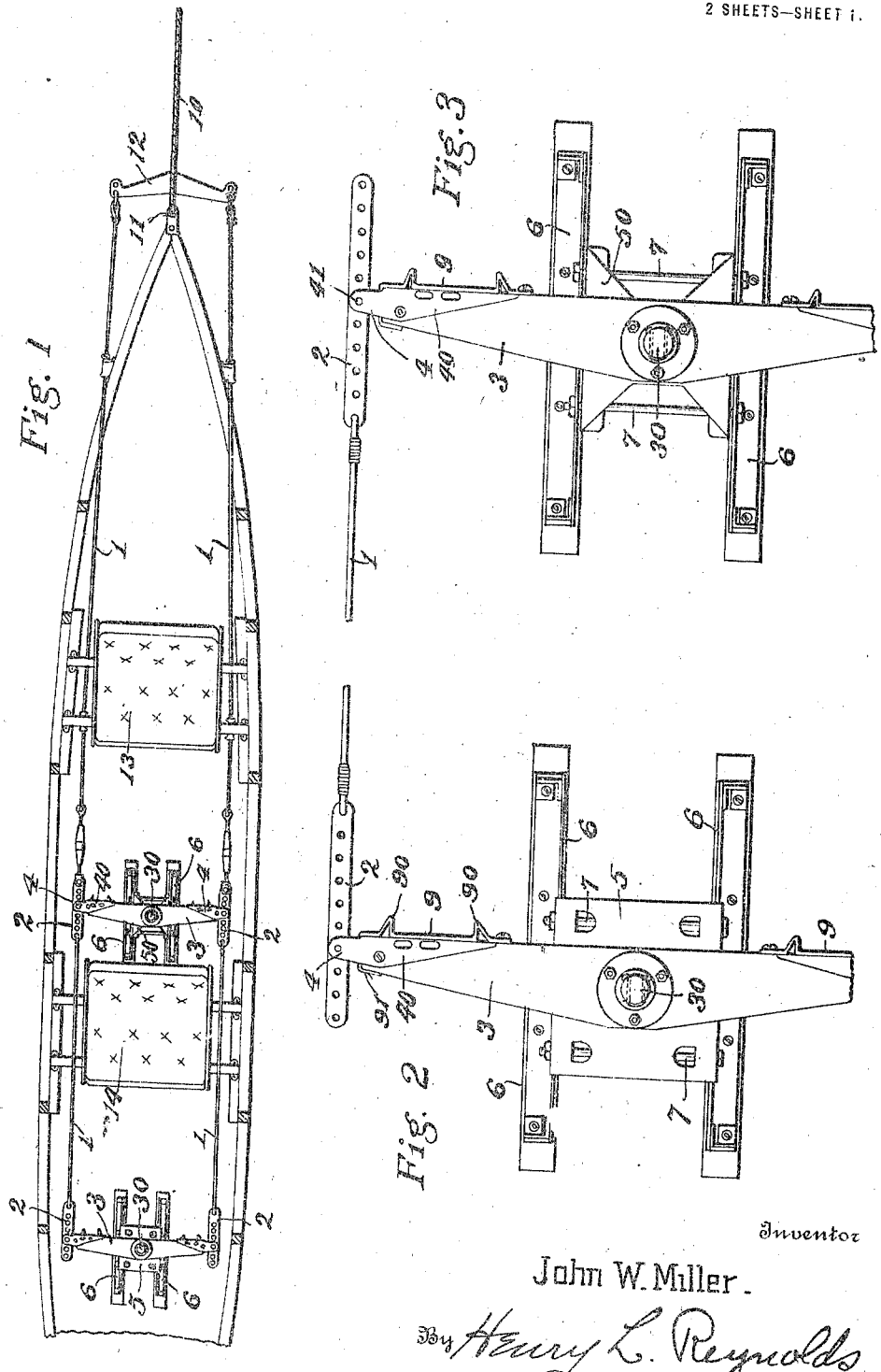

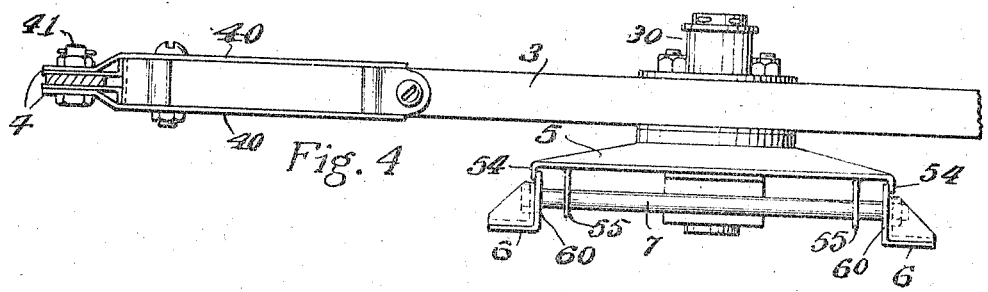
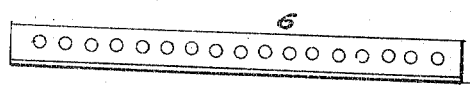
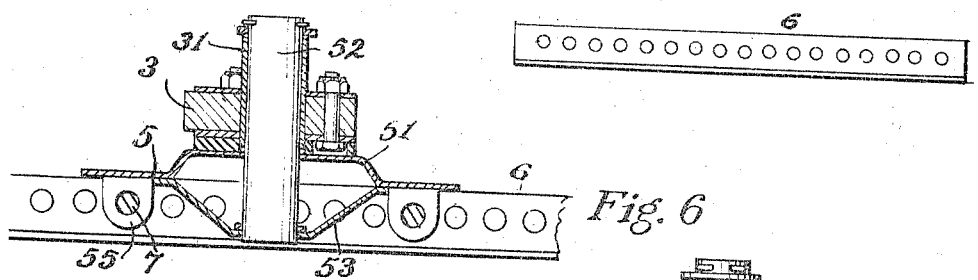
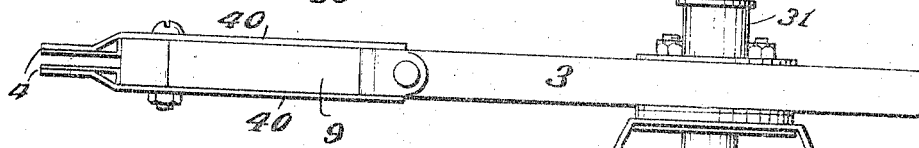
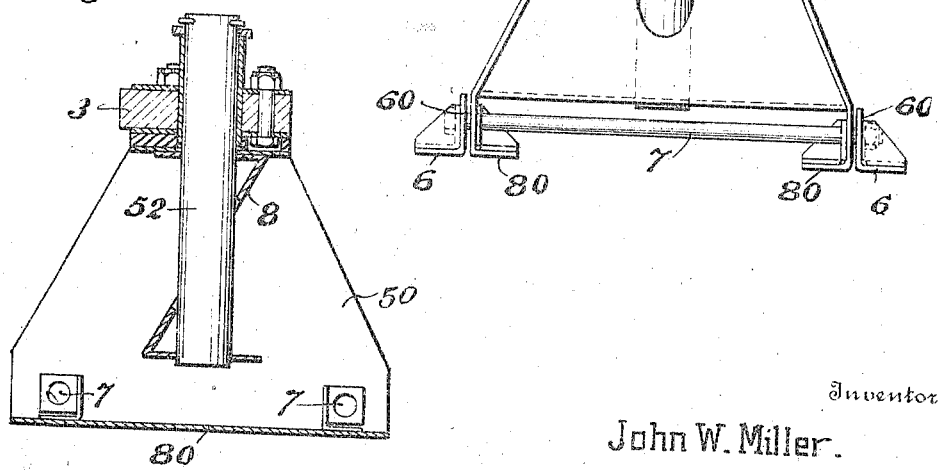

JOHN W. MILLER, OF SEATTLE, WASHINGTON, ASSIGNOR TO BOEING AIRPLANE CO., OF SEATTLE, WASHINGTON, A CORPORATION OF WASHINGTON.

STEERING MECHANISM FOR AEROPLANES.

1,290,280.  Specification of Letters Patent.  Patented Jan. 7, 1919.

Application filed April 10, 1918. Serial No. 227,613.

*To all whom it may concern:*

Be it known that I, JOHN W. MILLER, a citizen of the United States, and resident of the city of Seattle, county of King, and State of Washington, have invented certain new and useful Improvements in Steering Mechanism for Aeroplanes, of which the following is a specification.

My invention relates to steering mechanism for aeroplanes, and consists of mechanism whereby adjustment may be made of the bar, or bars, by which the steering is accomplished so as to compensate for operators who are short or tall of stature thus adjusting for best results by the individual using it.

The object of my invention is to provide an adjustment of this character which may be conveniently and easily adjusted and which is also reliably constructed and dependable.

The features of my invention comprise the combinations of parts which will be hereinafter particularly pointed out in the claims.

In the accompanying drawings I have shown a form of construction for carrying out my invention which is that now preferred by me.

Figure 1 is a plan view of a portion of the fuselage of an aeroplane showing the steering mechanism thereon.

Figs. 2 and 3 are plan views on a larger scale, showing respectively, the forward and rear steering bars and the manner of connecting the same with the steering leads.

Fig. 4 is an elevation of the forward steering bar as seen from the rear, one end thereof being broken away.

Fig. 5 is a transverse section taken through the steering pivot of the forward steering bar.

Fig. 6 is a view similar to Fig. 4, showing the rear steering bar.

Fig. 7 is a transverse section through the steering pivot of the rear steering bar.

Fig. 8 is a side view of one of the bars upon which the pivot basis for the steering bar is mounted for adjustment.

In the operation of aeroplanes, the steering rudder is usually controlled from a pivoted bar which is controlled by the feet of the operator. A seat for the operator is provided, this being usually in a fixed position. It is evident that with the seat and with the steering bar, both secured in fixed and unadjustable positions, the steering bar must be placed near enough to the seat to be operated by a comparatively short man and when so placed is not in position to be operated to the best advantage by a tall man.

The object of my invention is to provide means for mounting one of these parts so as to adjust the separation between the seat and the steering bar and in this way accommodate different height and length of legs of the operator.

In Fig. 1, 1 represents the two steering leads, by this meaning the rods, cables or whatever connecting devices may be used for communicating the steering action from the operator to the rudder. A rudder 10 is shown pivoted at the point 11 to the fuselage and controlled through a yoke or bar 12 to which the steering leads 1 are connected. The construction of this latter part of the apparatus is immaterial. My invention pertains to the steering bars which are operated by the feet and the manner of adjusting the same.

Each one of the steering leads 1, passes forward to beyond both of the seats 13 and 14. Where provision is made for carrying two men, provision is also made so that either of these men may control the steering. In each one of the leads 1, adjacent the ends of the steering bars 3, is placed a bar 2 which is of flat metal and provided with a series of holes. These bars constitute a portion of the steering leads; that is, the controlling effort is communicated through these bars.

Steering bars 3 are pivotally mounted upon their centers 30 and at their outer ends are provided with a clip 4 which has a top and bottom ear spaced apart so as to pass over or embrace the adjusting bar 2 of the steering leads. A bolt or pin 41, passing through the holes in these ears and the corresponding holes in the adjustment bar 2, pivotally secure the two together.

Each of the steering bars 3 is pivoted centrally upon a pivot, as 30. This pivot is carried by a pivot base, as 5 and 50, these varying slightly in construction for the front and the rear bars, although being the same in principle. These pivot bases are mounted upon fore-and-aft extending bars 6, which are secured upon the frame in fixed position. The method of securing is such as will make it possible to conveniently adjust the steering bar as a whole toward the front or the rear and by amounts corresponding with the spacing of the holes in the adjustment bars 2.

The pivot base 5, which is that of the forward position, has its main element consisting of a plate of sheet metal 5, which is stamped into the shape clearly shown in Figs. 4 and 5. The main plate 5 has a center 51 slightly raised and has a short section 52 of pipe secured thereto and also securely held by a supplemental plate 53 which is stamped downward and engages the lower end of the pivot or pipe 52. The plate 53 is secured by its ends to the under surface of the main plate 5.

Each of the steering rods 3 has a short pipe section 31 secured therein and fitting over the pipe section 52 which forms the fixed pivot. The plate 5 which forms the base for the forward steering bar has its edges 54 flanged downward and so positioned as to extend over the upper edge of the vertical flange 60 of the supporting bar 6. This prevents lateral movement of the pivot base. The plate 5 also has ears 55 stamped therefrom and extending downwardly, these being provided with holes for the receipt of the securing bolts 7. The vertical flanges 60 of the supporting ears are provided with holes spaced to conform to the spacing of the holes in the adjustment bar 2. The bolts 7 pass through the holes in the bar 6 and also through the holes in the ears 55 and thus secure the pivot base in adjusted position.

The pivot base 50 for the rear steering bar, is somewhat different in construction, as the steering bar is mounted at a somewhat higher elevation. This base employs a plate 8, which is bent upwardly and which is so shaped as to have its lower portion placed just within the supporting bars 6. The lower edges of this plate are preferably bent inward so as to form a stiffening flange 80.

A Z-shaped plate 8 is secured at top and bottom to the side portions of the plate 50 and forms a support for the lower end of the pivot tube 52. The vertical webs 60 of the supporting bars 6 are provided with holes spaced as previously described, through which the securing bolts 7 pass. The manner of adjusting is similar to that described for the other steering bar.

It is evident that by the means illustrated, or their equivalent, it is possible to quickly adjust the position of the steering bars 3 so as to make them conform to the length of the leg of the operator, and by constructing the adjusting means so that the increment of spacing in which adjustment is permissible, both in the steering leads and of the pivot base with its support, shall be alike, there is no probability of making an adjustment which will not work well. The adjustment for different positions is a matter of only a few minutes' time and it contributes to the convenience of control.

The means for connecting the steering bars with the adjustment bars 2 of the steering leads consists of a sheet metal stamping which has two side portions 40, connected by the central portion of the plate to form a fitting which is U-shape in transverse cross-section and which fits over the outer end of the bar 3. This forms a light and yet a strong fitting.

To form convenient means of securing and engaging this bar with the feet, a strip 9 of metal, is secured to the rear edge of the steering bar. This is bent so as to form two slight brackets 90, spaced apart so as to admit the sole of the operator's shoe between them and to prevent the possibility of the foot slipping off the bar even should the same be turned a considerable angle. This bar is preferably continued and bent over the outer end of the bar 3, which bar 3 is preferably made of wood.

This type of construction makes a steering bar which is very strong and yet light. The adjusting means described makes it possible to adjust these steering bars to conform to any reasonable requirement as to their position.

What I claim as my invention is:

In a steering control for aeroplanes, steering leads, adjustment bars inserted in said steering leads and having a series of holes for adjustment purposes, a foot bar adapted to have its ends pivoted to said adjustment bars, a pivot base for the foot bar, supporting bars extending in a fore-and-aft direction and having a series of holes conforming in spacing with the spacing of the holes in the adjustment bars, and bolts for securing the pivot base passing through said holes in the supporting bars.

Signed at Seattle, Washington, this 30th day of March, 1918.

JOHN W. MILLER.